Aug. 5, 1958  W. E. BOYD  2,845,743
JOINTED FISHING LURE
Filed May 17, 1955

*INVENTOR.*
WILLIAM E. BOYD
BY
ATTORNEY

United States Patent Office 2,845,743
Patented Aug. 5, 1958

2,845,743

JOINTED FISHING LURE

William E. Boyd, Detroit, Mich.

Application May 17, 1955, Serial No. 508,927

2 Claims. (Cl. 43—42.15)

This invention relates to improvement in a fishing lure, particularly a jointed lure comprising separable segments or plug portions adapted to be used independently as single plugs or together as an articulated plug.

An important object of the present invention is to provide a jointed lure of the foregoing character having improved clip means for detachably connecting the plug portions together and assuring freedom of articulation therebetween.

Another and more specific object is to provide a jointed lure comprising a leading plug or body having a bore therethrough, a trailing plug or body, and improved means including a resilient wire-formed clip detachably connecting the plugs together. The clip comprises a wire portion or shank reversely bent at opposite ends to form front and rear loops or eyes. The front loop is adapted to be removably inserted into the rear opening of the bore and to project forwardly from the bore for connection with a fish line or leader. The rear loop is oversize with respect to the rear opening and is articulately connected with a forward eyelet of the trailing plug and also preferably with the eyelet of a multiple pronged fish-hook. By virtue of the oversize rear loop, the latter cannot be pulled forwardly into the bore of the leading plug and jamming of the articulated connections for the plugs and fish-hook is avoided.

Still another object is to provide such a clip wherein the rear loop has a portion bulging laterally or transversely beyond the rear opening of the bore at a location intermediate the rear end of the leading plug and the eyelet of the trailing plug. Thus the bulging portion or bulge serves both as an abutment to prevent entry of the rear loop into the bore and also as a hanger or support for the fish-hook intermediate the plugs. The fish-hook is freely articulated on the bulging portion of the rear loop and the trailing plug is freely articulated on the rear loop rearwardly of the bulging portion, whereby interference between the fish-hook and trailing plug is minimized.

Other objects of this invention will appear in the following description and appended claims, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 4:
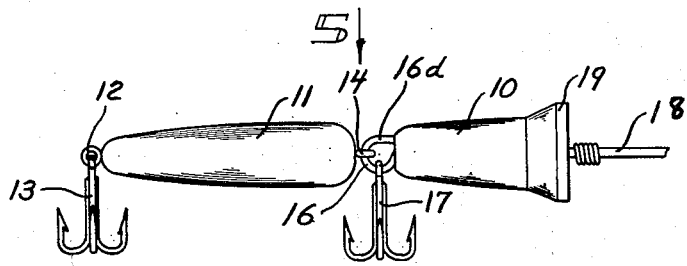
Fig. 4 is a side elevational view showing the assembly connected together for use as a jointed lure.
Figure 5:
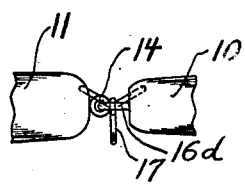
Fig. 5 is a fragmentary plan view taken in the direction of the arrow 5 of Fig. 4.

Referring to the drawings, the particular embodiment of the present invention illustrated by way of example comprises a jointed or articulated fishing lure having a leading body or plug 10 and a trailing body or plug 11, both plugs being of circular section and formed of suitable rigid material such as hard wood or molded plastic. An eyelet 12 suitably secured as for example by screw means to the rear end of the plug 11, Fig. 4, is articulately interconnected with the eyelet of a multiple-prong fish-hook 13. Similarly a forward eyelet 14 having a screw shaft secured to the forward end of the body 11 is provided for articulate connection with either the plug 10 or a fish-line as described below.

A bore 15 extending axially through the plug 10 is adapted to contain a spring wire clip having a central shank portion 16 reversely bent at opposite ends to form front and rear loops or eyes 16a and 16d respectively terminating inwardly at nodes or bends 16b and 16e adjacent the shank 16, from which reversed portions or arms 16c and 16f extend angularly and generally toward each other. In the assembled condition, Fig. 3, the shank 16 extends along one sidewall of the bore 15, the reversed portions or arms 16c and 16f extend back into the bore 15, and the loops 16a and 16d are substantially closed.

Figure 1:
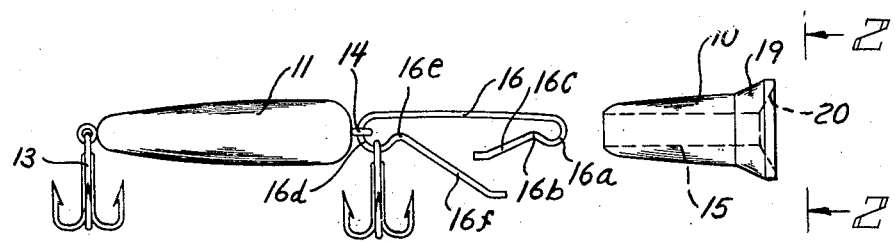
Fig. 1 is a side elevational view of the assembly embodying the present invention, the spring clip being shown in its open untensed condition removed from the bore of the leading body or plug.

In their untensed condition, Fig. 1, the loops 16a and 16d are normally open and together with the arms 16c and 16f lie in substantially a common plane. When the clip is inserted into the bore 15, the ends of the reversed arms 16c and 16f cross each other under tension and firmly engage the sidewall of the bore 15 oppositely from the shank portion 16.

In order to facilitate insertion of the clip into the bore 15, or removal therefrom, the tips of the reversed arms are bent inwardly to provide guide portions. Thus when the clip is in the tensed condition, the loop 16a will pass readily into the rear opening of the bore 15 and through the bore so as to project from the latter's forward end and permit attachment with a leader or fish line 18.

The rear portion of the loop 16d passes transversely with respect to the axis of the bore 15 freely through the eyelet 14, then transversely or laterally beyond the rear opening of the bore 15, forwardly freely through the eyelet of a multiple prong fish-hook 17, and finally back toward the shank 16 and into the bore 15. Accordingly the hook 17 is freely articulated on the transversely bulged portion of the loop 16d and the trailing plug 11 is freely articulated on the rear end of the loop 16d, whereby interference between the plug 11 and hook 17 is avoided. The transversely bulging portion of the loop 16d also abuts the rear end of the plug or body 10 to prevent passage of the loop 16d into the bore 15, whereby spaced relationship between the plugs 10 and 11 is assured. In the event that the plug 10 should snag on weeds or rocks, tension on line 18 cannot pull the loop 16d forwardly through into the bore 15 and the possibility of jamming either the plug 11 or hook 17 against the rear end of the plug 10 is avoided.

In accordance with the present construction, the nodes 16d and 16e reinforce their respective loops to minimize the possibility of distorting or pulling the latter out of shape. For example the node 16b urged upwardly in Fig. 3 against the shank 16 by virtue of the spring tension in the reversed arm 16c tends to maintain the shape of loop 16a when a strong pull is exerted on line 18. Likewise the node 16e abutting the shank 16 prevents the loop 16d from collapsing and entering the bore 15 when force is exerted by line 18 tending to pull the spring clip forwardly with respect to the body or plug 10.

In operation of the device the double plug system assembled as in Fig. 4 comprises a jointed freely articulated lure adapted to move through the water in a wiggling zig-zag motion when pulled by line 18. A life-like motion is enhanced by the streamlined contour of the plug bodies 10 and 11 in cooperation with the flared annular crown or head 19 of the leading plug 10 conically recessed at 20 around the forward opening of the bore 15.

Figures 2, 3:
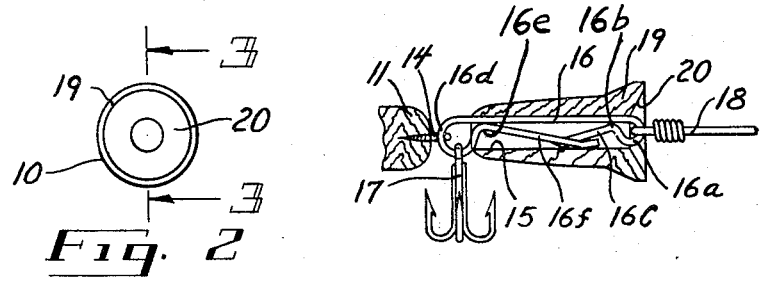
Fig. 2 is a front elevational view of the leading plug taken in the direction of the arrows along the line 2—2 of Fig. 1.
Fig. 3 is a fragmentary longitudinal mid-sectional view showing the leading plug connected with the trailing plug, taken in the direction of the arrows substantially along the line 3—3 of Fig. 2.

When it is desired to use the plugs separately, the spring clip is pulled rearwardly from the body 10, disassembled from the eyelet 14, and thereafter reinserted into the bore 15 with the hook 17 interconnected with the bulging portion of the eyelet 16d as shown in Fig. 3. Thereafter either the leading plug 10 can be used as a lure, separately from the trailing plug 11, or the eyelet 14 rather than loop 16a can be connected with the line 18 to permit use of the trailing plug 11 separately from the plug 10.

I claim:

1. A jointed fishing lure comprising a trailing body having an eyelet at its forward end, a leading body having a bore therethrough, and a removable one piece spring wire clip means comprising shank portion adapted to extend within said bore and being reversely bent at opposite ends to form front and rear loops terminating in oppositely extending expandable and contractible yieldable members extending integrally from said loops, said members terminating in free ends within the bore and being contracted toward said shank portion to yieldingly engage the bore wall when the clip means is inserted into the bore, said front loop being adapted for attachment with a fish line, the rear loop having a portion extending rearwardly from said bore for connection with said eyelet, said portion bulging transversely of said bore beyond the latter's rear opening to prevent said rear loop from entering said bore and to space said bodies for free articulate connection of a fish hook to said rear loop.

2. A jointed fishing lure comprising a trailing body having an eyelet at its forward end, a leading body having a bore therethrough, a removable one piece spring wire clip comprising a shank portion extending within said bore and being reversely bent at opposite ends to form front and rear loops terminating in oppositely extending yieldable members disposed within said bore and terminating in free ends, said yieldable members being contracted toward said shank portion under tension, the front loop being adapted for attachment with a fish line, the rear loop having a portion extending rearwardly from said bore and bulging transversely thereof beyond the latter's rear opening to prevent said rear loop from entering said bore and to provide an articulate connection with said eyelet, and a fish hook connected with the bulging portion of the rear loop and so articulated as to be free to rotate in transverse directions.

References Cited in the file of this patent

UNITED STATES PATENTS

| | | |
|---|---|---|
| 1,140,279 | Myers | May 18, 1915 |
| 2,036,954 | Murray | Apr. 7, 1936 |
| 2,069,972 | Schroeder | Feb. 9, 1937 |
| 2,481,789 | Smith | Sept. 13, 1949 |
| 2,741,057 | Morris et al. | Apr. 10, 1956 |

FOREIGN PATENTS

| | | |
|---|---|---|
| 163,584 | Australia | June 24, 1955 |
| 1,015,165 | France | July 2, 1952 |